United States Patent
Tsuneda et al.

(10) Patent No.: US 8,532,655 B2
(45) Date of Patent: Sep. 10, 2013

(54) MOBILE COMMUNICATION TERMINAL, MOBILE COMMUNICATION SYSTEM, AND MOBILE COMMUNICATION METHOD

(75) Inventors: Takayuki Tsuneda, Chiyoda-ku (JP); Masafumi Masuda, Chiyoda-ku (JP); Takaaki Sato, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/638,740

(22) PCT Filed: Apr. 1, 2011

(86) PCT No.: PCT/JP2011/058416
§ 371 (c)(1),
(2), (4) Date: Nov. 29, 2012

(87) PCT Pub. No.: WO2011/125934
PCT Pub. Date: Oct. 13, 2011

(65) Prior Publication Data
US 2013/0065586 A1    Mar. 14, 2013

(30) Foreign Application Priority Data
Apr. 1, 2010    (JP) .................................. 2010-085313

(51) Int. Cl.
*H04W 60/00*    (2009.01)
(52) U.S. Cl.
USPC ........................................ 455/435.1; 370/332
(58) Field of Classification Search
USPC ................... 455/435.1, 435.2, 444; 370/331, 370/332, 338
See application file for complete search history.

(56) References Cited

U.S. PATENT DOCUMENTS

| | | | |
|---|---|---|---|
| 2007/0105527 A1 | 5/2007 | Nylander et al. | |
| 2008/0153533 A1 | 6/2008 | Claussen et al. | |
| 2009/0137249 A1* | 5/2009 | Horn et al. | 455/435.2 |
| 2010/0035622 A1 | 2/2010 | Ito et al. | |
| 2010/0111042 A1* | 5/2010 | Chou et al. | 370/332 |

FOREIGN PATENT DOCUMENTS

| | | |
|---|---|---|
| JP | 2009 510973 | 3/2009 |
| JP | 2010 41652 | 2/2010 |
| WO | 2008 079203 | 7/2008 |

OTHER PUBLICATIONS

Japanese Office Action Issued Jun. 21, 2011 in JP 2010 085313 Filed Apr. 1, 2010 (with English translation).
International Search Report Issued Jun. 28, 2011 in PCT/JP11/58416 Filed Apr. 1, 2011.

* cited by examiner

*Primary Examiner* — Phuoc Doan
(74) *Attorney, Agent, or Firm* — Oblon, Spivak, McClelland, Maier & Neustadt, L.L.P.

(57) ABSTRACT

A UE 10 includes a storage unit 12 configured to store a specific cell accessible by the mobile communication unit and a neighboring cell element for identifying a neighboring cell provided around the specific cell, while associating the specific cell and the neighboring cell element with each other, a search unit 14 configured to search for the specific cell accessible, and a registration unit 13 configured to register a element for identifying a transition source cell as the neighboring cell element, when the UE 10 is transitioned from the transition source cell to the specific cell stored in the storage unit 12.

6 Claims, 5 Drawing Sheets

| SPECIFIC CELL ELEMENT | SPECIFIC CELL INFORMATION | NEIGHBORING CELL ELEMENT | NEIGHBORING CELL INFORMATION |
|---|---|---|---|
| SPECIFIC CELL #1 | FREQUENCY #A, SPREADING CODE D | MACROCELL #1 | FREQUENCY #A, SPREADING CODE A |
| | | MACROCELL #3 | FREQUENCY #C, SPREADING CODE C |
| | | SPECIFIC CELL #1 | FREQUENCY #A, SPREADING CODE D |
| | | SPECIFIC CELL #2 | FREQUENCY #B, SPREADING CODE E |
| SPECIFIC CELL #2 | FREQUENCY #B, SPREADING CODE E | MACROCELL #1 | FREQUENCY #A, SPREADING CODE A |
| | | SPECIFIC CELL #1 | FREQUENCY #A, SPREADING CODE D |
| | | SPECIFIC CELL #2 | FREQUENCY #B, SPREADING CODE E |
| ... | ... | ... | ... |

| SPECIFIC CELL ELEMENT | SPECIFIC CELL INFORMATION | NEIGHBORING CELL ELEMENT | NEIGHBORING CELL INFORMATION |
|---|---|---|---|
| SPECIFIC CELL #1 | FREQUENCY #A, SPREADING CODE D | MACROCELL #1 | FREQUENCY #A, SPREADING CODE A |
| | | MACROCELL #3 | FREQUENCY #C, SPREADING CODE C |
| | | SPECIFIC CELL #1 | FREQUENCY #A, SPREADING CODE D |
| | | SPECIFIC CELL #2 | FREQUENCY #B, SPREADING CODE E |
| SPECIFIC CELL #2 | FREQUENCY #B, SPREADING CODE E | MACROCELL #1 | FREQUENCY #A, SPREADING CODE A |
| | | SPECIFIC CELL #1 | FREQUENCY #A, SPREADING CODE D |
| | | SPECIFIC CELL #2 | FREQUENCY #B, SPREADING CODE E |
| ... | ... | ... | ... |

MOBILE COMMUNICATION TERMINAL, MOBILE COMMUNICATION SYSTEM, AND MOBILE COMMUNICATION METHOD

TECHNICAL FIELD

The present invention relates to a mobile communication terminal configured to communicate with a macrocell and a specific cell configurable with an access type, and relates to a mobile communication system and a mobile communication method.

BACKGROUND ART

There has known a specific cell referred to as a CSG (Closed Subscriber Group) cell, a home cell, a femtocell, or the like. Note that an access type is configurable in the specific cell. The access type is "Closed," "Hybrid," or "Open".

The "Closed" specific cell is configured to permit only a specific user (UE; User Equipment) to receive provision of services. The "Hybrid" specific cell is configured to permit a specific user to perform communications with a higher quality than other users (non-specific users). The "Open" specific cell is configured to permit all the users to receive provision of services, as is the case with a general macrocell.

Generally, a service area of a specific cell is smaller than a service area of a macrocell, and transmission power of the specific cell is smaller than transmission power of the macrocell. Thus, if a mobile communication terminal performs cell selection based on an electrical field intensity of a control signal such as a pilot channel or the like, the specific cell may not be selected as a transition target cell.

Thus, a frequency and a spreading code of a specific cell are registered in a mobile communication terminal, and the mobile communication terminal is configured to always search for the specific cell as a search candidate cell. The mobile communication terminal is configured to select, if the specific cell is found, the specific cell as the transition target cell regardless of the electrical field intensity of the control signal.

In addition, another technique has also been proposed in which a neighboring cell list of specific cells and macrocells are created and is broadcasted to mobile communication terminals (e.g., Patent Document 1).

PRIOR ART DOCUMENT

Patent Document
Patent Document 1: Published Japanese Translation of PCT International Application No. 2009-510973

SUMMARY OF THE INVENTION

Even though the neighboring cell list is broadcasted, however, there may be a case where the neighboring cell list includes the specific cell not available to the mobile communication terminal. Thus, the specific cell available to the mobile communication terminal is preferably registered in the mobile communication terminal.

Moreover, in the case of a mobile station configured to always search for a specific cell registered in a mobile communication terminal as the search candidate cell, the search for the specific cell is uselessly performed when the mobile communication terminal is geographically far from the specific cell.

Thus, the present invention has been made to solve the above problem and has an objective of providing a mobile communication terminal, a mobile communication system, and a mobile communication method that allow the mobile communication terminal to appropriately search for an available specific cell.

A mobile communication terminal according to the first feature is configured to communicate with a macrocell and a specific cell configurable with an access type. The mobile communication terminal includes a reception unit configured to receive, from a cell that is any one of the specific cell and the macrocell, notification including an element for identifying the cell, a storage unit configured to store a specific cell accessible by the mobile communication unit and a neighboring cell element for identifying a neighboring cell provided around the specific cell, while associating the specific cell and the neighboring cell element with each other, a search unit configured to search for the specific cell stored in the storage unit, and a registration unit configured to register a element for identifying a transition source cell as the neighboring cell element in the storage unit, when the mobile communication terminal is transitioned from the transition source cell to the specific cell accessible by the mobile communication unit.

In the first feature, the search unit may switch a method for searching for the specific cell stored in the storage unit depending on whether the element included in the notification is included in the neighboring cell element.

In the first feature, the search unit may not search for the specific cell stored in the storage unit when the element included in the notification is not included in the neighboring cell element.

In the first feature, the search unit may search for the specific cell stored in the storage unit at first intervals when the element included in the notification is included in the neighboring cell element, and may search for the specific cell stored in the storage unit at second intervals longer than the first intervals when the element included in the notification is not included in the neighboring cell element.

A mobile communication system according to the second feature includes a mobile communication terminal configured to communicate with a macrocell and a specific cell configured to be configurable with an access type. The mobile communication system includes a reception unit configured to receive, from a cell that is any one of the specific cell and the macrocell, notification including an element for identifying the cell, a storage unit configured to store a specific cell accessible by the mobile communication unit and a neighboring cell element for identifying a neighboring cell provided around the specific cell, while associating the specific cell and the neighboring cell element with each other, a search unit configured to search for the specific cell stored in the storage unit, and a registration unit configured to register a element for identifying a transition source cell as the neighboring cell element in the storage unit, when the mobile communication terminal is transitioned from the transition source cell to the specific cell accessible by the mobile communication unit.

A mobile communication method according to the third feature is used in a mobile communication terminal configured to communicate with a macrocell and a specific cell configured to be configurable with an access type. The mobile communication terminal includes a storage unit configured to store a specific cell accessible by the mobile communication unit and a neighboring cell element for identifying a neighboring cell provided around the specific cell, while associating the specific cell and the neighboring cell element with each other. The method includes a step A of receiving, from a cell that is any one of the specific cell and the macrocell, notification including an element for identifying the cell, a step B of searching for the specific cell stored in the storage unit, and a step C of registering a element for identifying a transition source cell as the neighboring cell element in the storage unit, when the mobile communication terminal is transitioned from the transition source cell to the specific cell accessible by the mobile communication unit.

MODE FOR CARRYING OUT THE INVENTION

A mobile communication system according to an embodiment of the present invention is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

[Summary Of Embodiments]

A mobile communication terminal according to an embodiment is configured to communicate with a specific cell configured to be configurable with an access type and with a macrocell. The mobile communication terminal includes: a reception unit configured to receive, from a cell that is any one of the specific cell and the macrocell, notification including an element for identifying the cell; a storage unit configured to store a neighboring cell element for identifying a neighboring cell provided around the specific cell accessible by the mobile communication terminal; a search unit configured to search for the specific cell accessible by the mobile communication terminal; and a registration unit configured to register a element for identifying a transition source cell as the neighboring cell element in the storage unit when the mobile communication terminal is transitioned from the transition source cell to the specific cell accessible by the mobile communication terminal.

In the embodiment, the registration unit registers the element for identifying the transition source cell as the neighboring cell element in the storage unit. In other words, the mobile communication terminal can build up the neighboring cell element for identifying the neighboring cell provided around the specific cell accessible by the mobile communication terminal. Thus, the mobile communication terminal can appropriately search for the specific cell by using the neighboring cell element.

[First Embodiment]
(Configuration of Mobile Communication System)

Figure 1:
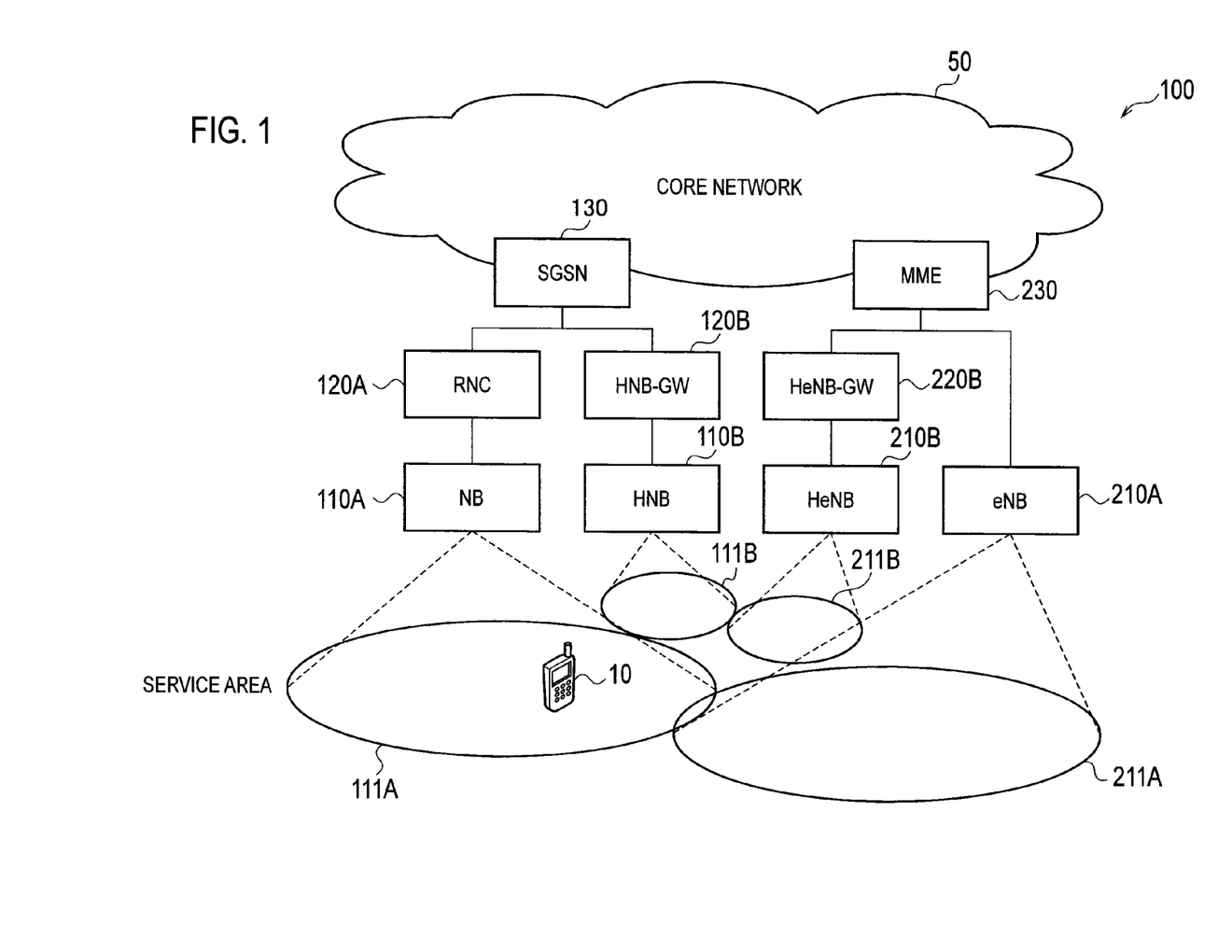
FIG. 1 is a diagram showing a mobile communication system 100 according to a first embodiment.

The configuration of a mobile communication system according to a first embodiment is described below by referring to a drawing. FIG. 1 is a drawing showing a mobile communication system 100 according to the first embodiment.

As shown in FIG. 1, the mobile communication system 100 includes a communication terminal device 10 (hereinafter, UE 10) and a core network 50. In addition, the mobile communication system 100 includes a first communication system and a second communication system.

For example, the first communication system is a communication system supporting UMTS (Universal Mobile Telecommunication System). The first communication system has a base station 110A (hereinafter, NB 110A), a home base station 110B (hereinafter, HNB 110B), an RNC 120A, a home base station gateway 120B (hereinafter, HNB-GW 120B), and an SGSN 130.

Note that a radio access network (UTRAN; Universal Terrestrial Radio Access Network) supporting the first communication system includes the NB 110A, HNB 110B, RNC 120A, and HNB-GW 120B.

For example, the second communication system is a communication system supporting LTE (Long Term Evolution). The second communication system has, for example, a base station 210A (hereinafter, eNB 210A), a home base station 210B (hereinafter, HeNB 210B), a home base station gateway 220B (hereinafter, HeNB-GW 220B), and an MME 230.

Note that a radio access network (E-UTRAN; Evolved Universal Terrestrial Radio Access Network) supporting the second communication system includes the eNB 210A, HeNB 210B, and HeNB-GW 220B.

The UE 10 is a device (User Equipment) configured to communicate with the first communication system or the second communication system. For example, the UE 10 has a function to perform radio communications with the NB 110A and the HNB 110B. Or, the UE 10 has a function to perform radio communications with the eNB 210A and the HeNB 210B.

The NB 110A is a device (NodeB) having a macrocell 111A and configured to perform radio communications with the UE 10 present in the macrocell 111A.

The HNB 110B is a device (Home NodeB) having a specific cell 111B and configured to perform radio communications with the UE 10 present in the specific cell 111B.

The RNC 120A is a device (Radio Network Controller) connected with the NB 110A and configured to establish a radio connection (RRC Connection) with the UE 10 present in the macrocell 111A.

The HNB-GW 120B is a device (Home NodeB Gateway) connected with the HNB 110B and configured to establish a radio connection (RRC Connection) with the UE 10 present in the specific cell 111B.

The SGSN 130 is a device (Serving GPRS Support Node) configured to exchange packets in a packet exchange domain. The SGSN 130 is provided in the core network 50. Although omitted in FIG. 1, a device (MSC; Mobile Switching Center) to perform line switching in a line switching domain may be provided in the core network 50.

The eNB 210A is a device (evolved NodeB) having a macrocell 211A and configured to perform radio communications with the UE 10 present in the macrocell 211A.

The HeNB 210B is a device (Home evolved NodeB) having a specific cell 211B and configured to perform radio communications with the UE 10 present in the specific cell 211B.

The HeNB-GW 220B is a device (Home evolved NodeB Gateway) connected with the HeNB 210B and configured to manage the HeNB 210B.

The MME 230 is a device (Mobility Management Entity) connected with the eNB 210A and configured to manage mobility of the UE 10 establishing the radio connection with the HeNB 210B. Also, the MME 230 is a device connected with the HeNB 210B via the HeNB-GW 220B and configured to manage the mobility of the UE 10 establishing the radio connection with the HeNB 210B.

Note that the macrocell and the specific cell should be understood as functions to perform radio communications with the UE 10. However, the macrocell and the specific cell are also used as terms to express service areas of cells. Also, a cell such as the macrocell or the specific cell is identified by a frequency, diffusion code, or time slot, which is used in a cell.

The specific cell is sometimes referred to as a femtocell, a CSG (Closed Subscriber Group) cell, a homecell, or the like. Also, the specific cell is configured to be configurable with an access type for defining UEs 10 allowed to access the specific cell. The access type is "Closed," "Hybrid," or "Open".

The "Closed" specific cell is configured to permit only a specific user (UE; User Equipment) managed by the specific cell to receive provision of services.

The "Hybrid" specific cell is configured to permit a specific user managed by the specific cell to perform communications with a high quality and is configured to permit a non-specific user not managed by the specific cell to perform communications with a best effort quality.

The "Open" specific cell is configured to permit all the UEs 10 to receive provision of services, as is the case with the macrocell. Here, in the "Open" cell, UEs 10 can perform communications with equal quality without being distinguished as to whether the UEs 10 are managed by the specific cell.

Note that the access type may be an "ACCESS CLASS BARRED" to prohibit an access of the UE 10 by each access class, or a "CELL BARRED" to prohibit an access of the UE 10 by each cell.

(Example of Cell Configuration)

Figure 2:
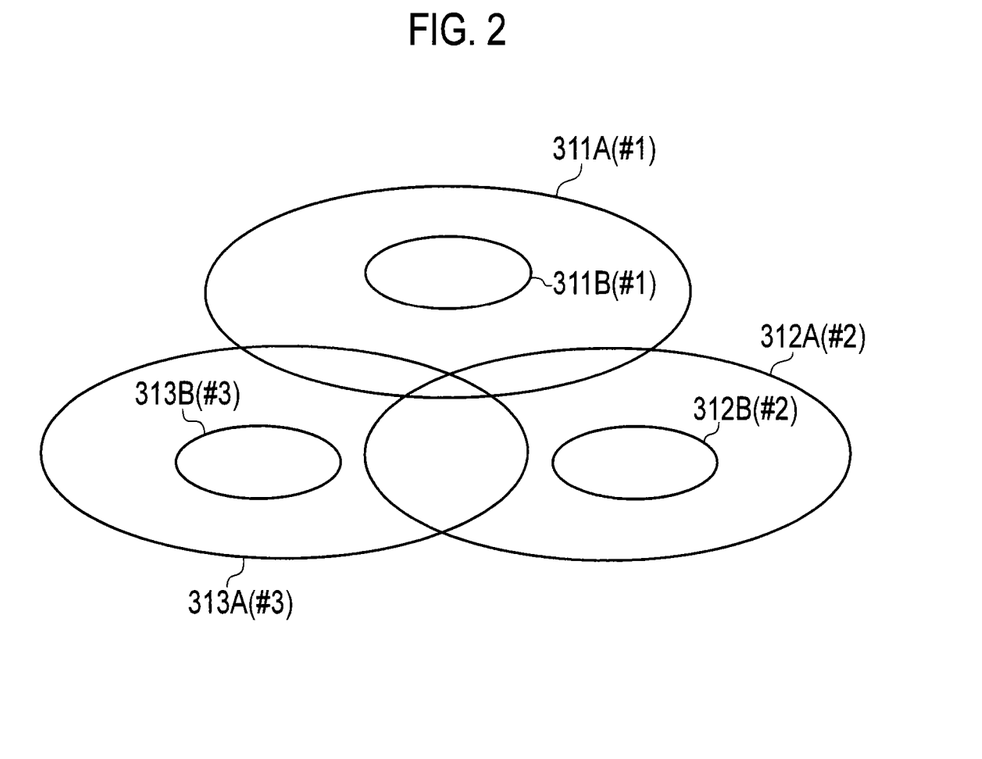
FIG. 2 is a diagram showing a cell configuration according to the first embodiment.

An example of a cell configuration according to the first embodiment is described below by referring to a drawing. FIG. 2 is a drawing showing an example of the cell configuration according to the first embodiment. Here, a case is exemplified where three macrocells (macrocell 311A, macrocell 312A, and macrocell 313A) and three specific cells (specific cell 311B, specific cell 312B, and specific cell 313B) mutually serve as neighboring cells.

For example, a service area of the macrocell 311A (hereinafter, also referred to as macrocell #1) overlaps with a service area of the specific cell 311B (hereinafter, also referred to as specific cell #1). The service area of the macrocell 311A is larger than the service area of the specific cell 311B. The same frequency (e.g., frequency A) is used in the macrocell 311A and the specific cell 311B.

A service area of the macrocell 312A (hereinafter, also referred to as macrocell #2) overlaps with a service area of the specific cell 312B (hereinafter, also referred to as specific cell #2). The service area of the macrocell 312A is larger than the service area of the specific cell 312B. The same frequency (e.g., frequency B) is used in the macrocell 312A and the specific cell 312B.

A service area of the macrocell 313A (hereinafter, also referred to as macrocell #3) overlaps with a service area of the specific cell 313B (hereinafter, also referred to as specific cell #3). The service area of the macrocell 313A is larger than the service area of the specific cell 3133. The same frequency (e.g., frequency C) is used in the macrocell 313A and the specific cell 313B.

It is to be noted that, in FIG. 2, the macrocell 111A and the macrocell 211A are not distinguished, and the macrocells are referred to as the macrocell 311A to macrocell 313A. Similarly, the specific cell 111B and the specific cell 211B are not distinguished, and the specific cells are referred to as the specific cell 311B to specific cell 313B.

Hereinbelow, a case where the mobile communication system 100 has the cell configuration shown in FIG. 2 is exemplified.

(Configuration of Mobile Communication Terminal)

Figure 3:
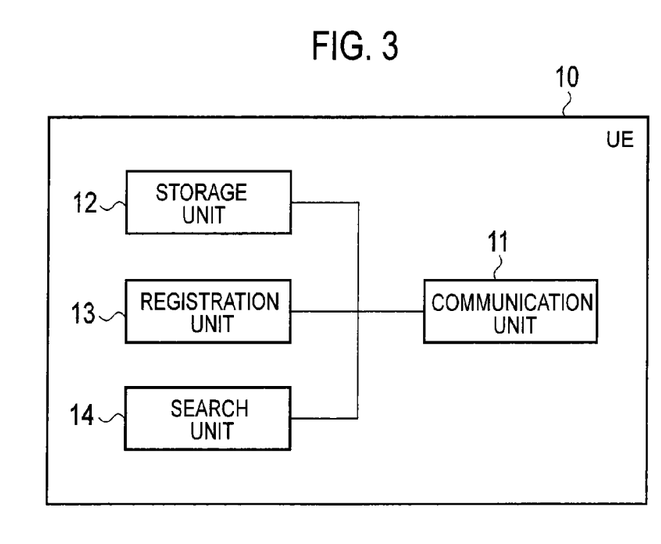
FIG. 3 is a diagram showing a UE 10 according to the first embodiment.

The configuration of a mobile communication terminal according to the first embodiment is described below by referring to a drawing. FIG. 3 is a diagram showing the UE 10 according to the first embodiment. As shown in FIG. 3, the UE 10 includes a communication unit 11, a storage unit 12, a registration unit 13, and a search unit 14.

The communication unit 11 is configured to perform radio communications with a base station (NB 110A or eNB 210A) that manages a macrocell. The communication unit 11 performs radio communications with a base station (HNB 110B or HeNB 210B) that manages a specific cell.

For example, the communication unit 11 receives, from a cell such as a macrocell or a specific cell, notification including information (hereinafter, cell element) for identifying the cell. Alternatively, the communication unit 11 receives, from a device (HNB 110B, HNB-GW 120B, HeNB 210B, or HeNB-GW 220B) that manages a specific cell, an access permission signal for giving a permission to access the specific cell.

The storage unit 12 stores a specific cell accessible by the UE 10 and a neighboring cell element for identifying a neighboring cell provided around the specific cell while associating the specific cell and the neighboring cell element with each other.

Figure 4:
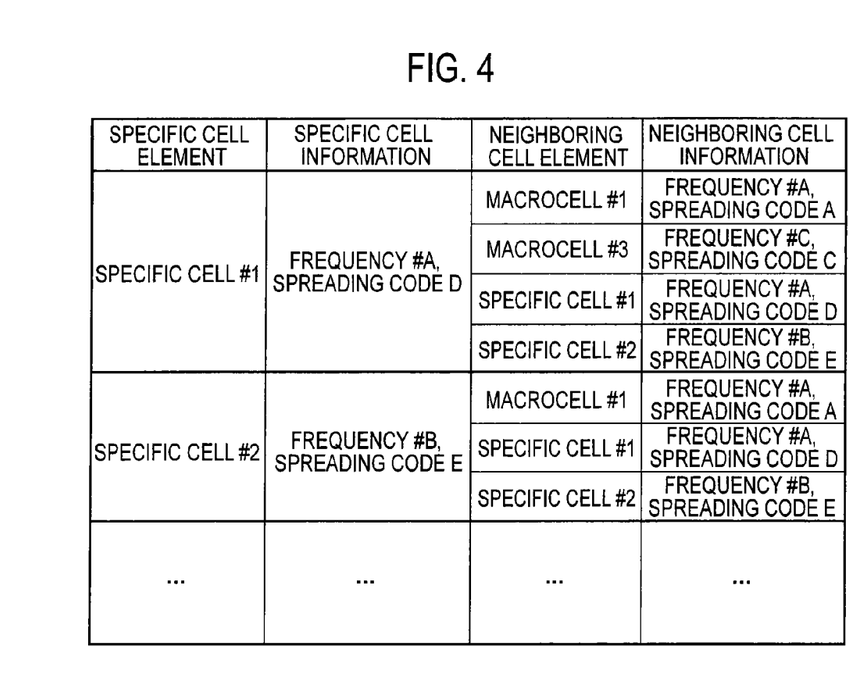
FIG. 4 is a diagram showing information stored in a storage unit 12 according to the first embodiment.

Specifically, as shown in FIG. 4, the storage unit 12 stores the "specific cell element", "specific cell information", "neighboring cell element", and "neighboring cell information" in association with each other.

"Specific cell element" is information for identifying a specific cell accessible by the UE 10. "Specific cell information" is cell information (frequency, spreading code, and the like) used in the specific cell accessible by the UE 10. "Peripheral cell element" is information for identifying a neighboring cell provided around the specific cell accessible by the UE 10. "Peripheral cell information" is cell information (frequency, spreading code, and the like) used in the neighboring cell.

For example, as shown in FIG. 4, the specific cell #1 is a specific cell accessible by the UE 10. The neighboring cell element associated with the specific cell #1 is the macrocell #1, the macrocell #3, the specific cell #2, and the specific cell #2. Here, the subject cell (i.e., the specific cell #1) may be included in the neighboring cell element.

In the example shown in FIG. 4, the macrocell #2 and the specific cell #3 are not included in the neighboring cell element associated with the specific cell #1.

As shown in FIG. 4, the storage unit 12 may store a plurality of specific cells (e.g., the specific cell #1 and specific cell #2) as specific cells accessible by the UE 10.

When the UE 10 is transitioned from the transition source cell to a specific cell accessible by the UE 10, the registration unit 13 registers a cell element for identifying the transition source cell as the neighboring cell element in the storage unit 12.

For example, in the example shown in FIG. 4, when the UE 10 is transitioned to the specific cell #1 from the macrocell #2, the registration unit 13 registers the cell element for identifying the macrocell #2, as the neighboring cell element associated with the specific cell #1. Similarly, when the UE 10 is transitioned to the specific cell #1 from the specific cell #3, the registration unit 13 registers the cell element for identifying the specific cell #3, as the neighboring cell element associated with the specific cell #1.

The search unit 14 searches for the specific cell accessible by the UE 10. In other words, the search unit 14 searches for the specific cell stored in the storage unit 12. Specifically, the search unit 14 performs the search to figure out whether the specific cell accessible by the UE 10 is at an available position by using the cell information (frequency, spreading code, or the like) used in the specific cell.

The search unit 14 switches a method for searching for the specific cell accessible by the UE 10 depending on whether the cell element included in the notification is included in the neighboring cell element.

For example, the search unit 14 does not have to search for the specific cell stored in the storage unit 12 when the cell element included in the notification is not included in the neighboring cell element. Alternatively, the search unit 14 searches for the specific cell accessible by the UE 10 at first intervals (interval α) when the cell element included in the notification information is included in the neighboring cell element, and searches for the specific cell stored in the storage unit 12 at second intervals (interval β) longer than the first intervals when the cell element included in the notification information is not included in the neighboring cell element.
(Operation of Mobile Communication Terminal)

Figure 5:
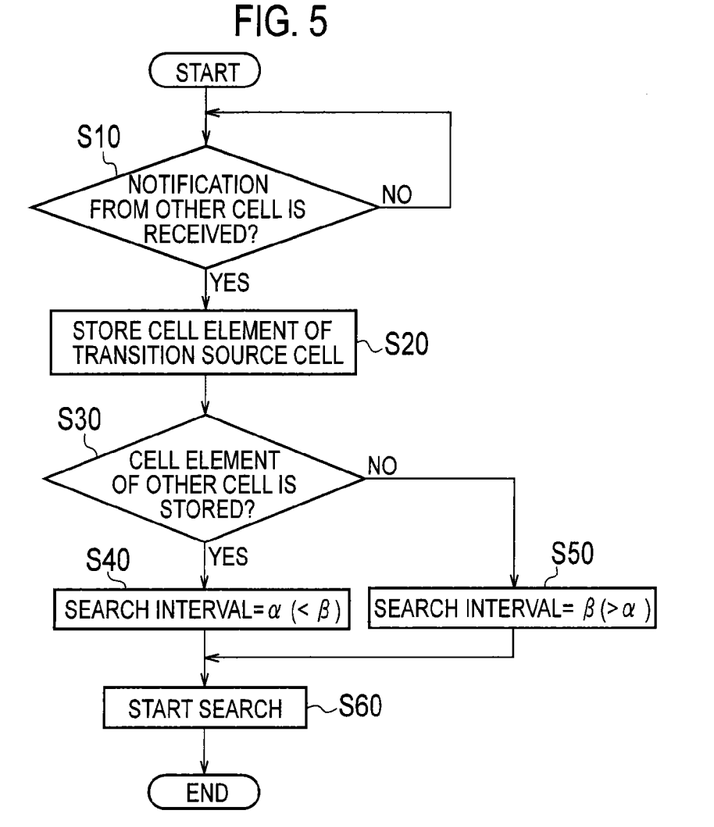
FIG. 5 is a flowchart showing an operation of the UE 10 according to the first embodiment.
Figure 6:
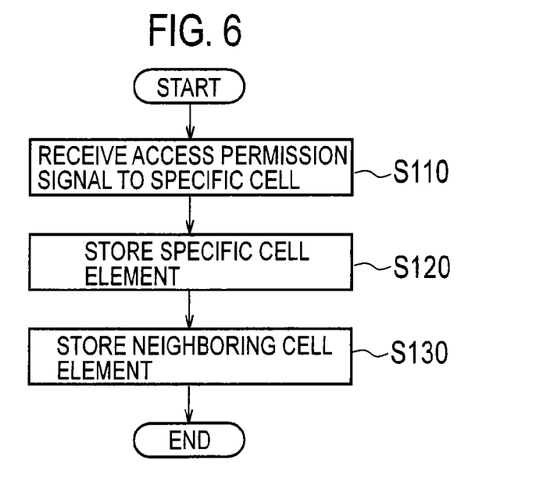
FIG. 6 is a flowchart showing an operation of the UE 10 according to the first embodiment.

An operation of a mobile communication terminal according to the first embodiment is described below by referring to drawings. FIG. 5 and FIG. 6 are each a flowchart showing an operation of the UE 10 according to the first embodiment.

Firstly, the flow for searching for a specific cell accessible by the UE 10 is described with reference to FIG. 5.

As shown in FIG. 5, in Step 10, the UE 10 receives from another cell, a cell element for identifying the other cell.

In Step 20, the UE 10 temporarily stores a cell element of a current cell (transition source cell). The UE 10 may store cell information (frequency and spreading code) of the current cell (transition source cell) in the storage unit 12. The UE 10 attempts a position registration for the other cell.

In Step 30 the UE 10 determines whether the cell element included in the notification information from the other cell is included in the neighboring cell element stored in the storage unit 12. When the cell element is included in the neighboring cell element, the UE 10 proceeds to the processing in Step 40. When the cell element is not included in the neighboring cell element, the UE 10 proceeds to the processing in Step 50.

In Step 40, the UE 10 sets the interval α shorter than the interval β as the search interval for the specific cell accessible by the UE 10.

In Step 50, the UE 10 sets the interval β longer than the interval α as the search interval for the specific cell accessible by the UE 10.

In Step 60, the UE 10 searches for the specific cell stored in the storage unit 12 at the search intervals set in Step 40 or Step 50. Specifically, the UE 10 performs a search to find out whether the specific cell accessible by the UE 10 is at an available position by using the cell information (frequency, spreading code, and the like) of the specific cell stored in the storage unit 12.

Secondary, a flow of transition of the UE 10 from the transition source cell to the specific cell accessible by the UE 10 is described with reference to FIG. 6.

As shown in FIG. 6, in Step 110, the UE 10 receives from a device (HNB 110B, HNB-GW 120B, HeNB 210B, or HeNB-GW 220B) that manages a specific cell, the access permission signal for giving permission to access the specific cell.

In Step 120, the UE 10 stores the cell element (specific cell element) of the specific cell accessible by the UE 10 in the storage unit 12. The UE 10 may store the cell information (frequency and spreading code) of the specific cell accessible by the UE 10 in the storage unit 12.

The processing in Step 120 may be omitted if the specific cell element is already stored in the storage unit 12.

In Step 130, the UE 10 stores the element of the transition source cell temporary stored in Step 20 in the storage unit 12, as a neighboring cell element. The UE 10 may store cell information (frequency and spreading code) of the transition source cell in the storage unit 12.

The processing in Step 130 may be omitted if the neighboring cell element is already stored in the storage unit 12.
(Advantageous Effect)

In the first embodiment, the registration unit 13 registers the cell element for identifying the transition source cell in the storage unit 12, as the neighboring cell element. Thus, the neighboring cell element for identifying the neighboring cells provided around the specific cell accessible by the UE 10 can be created in the UE 10. Thus, the UE 10 can appropriately search for a specific cell by using the neighboring cell element.

For example, the UE 10 does not search for the specific cell accessible by the UE 10 when the cell element included in the notification is not included in the neighboring cell element. This can reduce the risk that the UE 10 would perform the search in vain because of being far from the specific cell. Accordingly, power consumption of the UE 10 can be reduced.

Alternatively, the UE 10 sets the longer search interval for the specific cell accessible by the UE 10 when the cell element included in the notification is not included in the neighboring cell element. This can reduces the load of search that may end up in vain because the UE 10 is far from the specific cell can be reduced. Accordingly, power consumption of the UE 10 can be reduced.
[Modification 1]

Modification 1 of the first embodiment is described below by referring to the drawings. The following description is provided mainly for portions different from those of the first embodiment.

Figure 7:
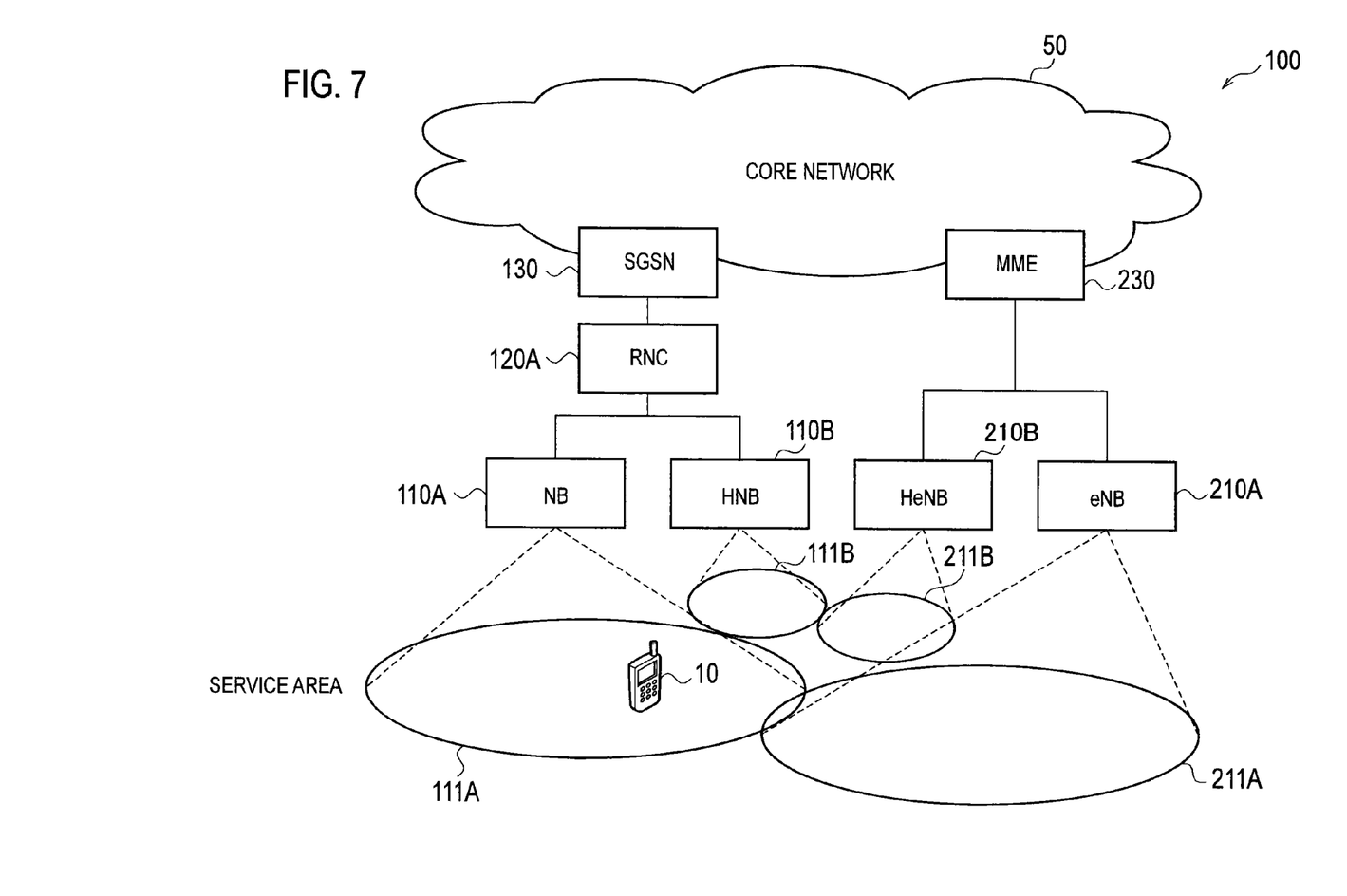
FIG. 7 is a diagram showing a mobile communication system 100 according to Modification 1.

Specifically, in the first embodiment, the upper level node of the HNB 110B is the HNB-GW 120B. In contrast, in Modification 1, the upper level node of the HNB 110B is the RNC 120A, as shown in FIG. 10.

In Modification 1, in place of the HNB-GW 120B, the RNC 120A manages the HNB 110B. Specifically, the RNC 120A provides the same function as that provided by the HNB-GW 120B, to the subordinate device of the RNC 120A.

In the first embodiment, the upper level node of the HeNB 210B is the HeNB-GW 220B. In contrast, in Modification 1, the upper level node of the HeNB 210B is the MME 230, as shown in FIG. 10.

In Modification 1, in place of the HeNB-GW 220B, the HeNB 210B provides the same function as that provided by the HeNB-GW 220B, to the subordinate device of the HeNB 210B.

Only the HNB-GW 120B may be omitted, and only the HeNB-GW 220B may be omitted.

[Other Embodiments]

The present invention has been described by using the above-described embodiment. However, it should not be understood that the description and the drawings, which constitute one part of this disclosure, are to limit the present invention. Various alternative embodiments, examples, and operational techniques will be obvious for those who are in the art from this disclosure.

Although not particularly mentioned in the embodiment described above, any cell element can be used as long as the specific cell or the macrocell can be identified with the cell element. Furthermore, any cell element can be used as long as the cell element is information with which the cells can be narrowed down in the process of identifying the specific cell or the macrocell. For example, the cell element may be "Cell ID" allocated to each of the cells such as a specific cell and a macrocell. Alternatively, the cell element may be "Location Area Code (LAC)" allocated for each location registration area including a plurality of cells. Alternatively, the cell element may be a combination of "Cell ID" and "LAC".

For example, it is to be noted that if "LAC" is used as a cell element, when the mobile communication terminal performs the transition from the transition source cell to an accessible specific cell, the "LAC" including the transition source cell is registered as the neighboring cell element.

In the embodiment, the UE 10 stores the neighboring cell element and the neighboring cell information in association with each other. However, the embodiment is not limited to this. Specifically, the UE 10 may store the neighboring cell element without associating it with the neighboring cell information. When the neighboring cell element is associated with the neighboring cell information, it is preferable to search for the specific cell by using the neighboring cell information (frequency and spreading code). On the other hand, when the neighboring cell element is not associated with the neighboring cell information, it is a matter of course to search for the specific cell without using the neighboring cell information (frequency and spreading code).

Note that an operation of the UE 10 may be implemented by hardware or may be implemented by a software module to be executed by a processor, or may be implemented in combination of the both.

The software module may be provided in any form of a recording medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such recording medium is connected with a processor so that the processor can read and write information on the recording medium. Also, such recording medium may be integrated on the processor. Instead, such recording medium and the processor may be provided inside ASIC. Such ASIC may be provided inside the UE 10. Alternatively such recording medium and the processor may be provided as discrete elements inside the UE 10.

Note that the contents of Japanese Patent Application No. 2010-085313 (filed on Apr. 1, 2010) are hereby incorporated by reference in their entirety.

Industrial Applicability

The present invention can provide a mobile communication terminal, a mobile communication system, and a mobile communication method, which allow the mobile communication terminal to appropriately search for an available specific cell, and thus is useful in radio communications and the like.

Explanation Of The Reference Numerals

10 ... communication terminal device, 11 ... communication unit, 12 ... storage unit, 13 ... registration unit, 14 ... search unit, 50 ... core network, 100 ... mobile communication system, 110A ... NB, 110B ... HNB, 111A ... macrocell, 111B ... specific cell, 120A ... RNC, 120B ... HNB-GW, 130 ... SGSN, 210A ... eNB, 210B ... HeNB, 211A ... macrocell, 211B ... specific cell, 220B ... HeNB-GW, 230 ... MME, 311A to 314A ... macrocell, 311B to 313B ... specific cell

The invention claimed is:

1. A mobile communication terminal configured to communicate with a macrocell and a specific cell configurable with an access type, comprising:
   a reception unit configured to receive, from a cell that is any one of the specific cell and the macrocell, notification including an element for identifying the cell;
   a storage unit configured to store a specific cell accessible by the mobile communication unit and a neighboring cell element for identifying a neighboring cell provided around the specific cell, while associating the specific cell and the neighboring cell element with each other;
   a search unit configured to search for the specific cell stored in the storage unit; and
   a registration unit configured to register a element for identifying a transition source cell as the neighboring cell element in the storage unit, when the mobile communication terminal is transitioned from the transition source cell to the specific cell accessible by the mobile communication unit.

2. The mobile communication terminal according to claim 1, wherein the search unit switches a method for searching for the specific cell stored in the storage unit depending on whether the element included in the notification is included in the neighboring cell element.

3. The mobile communication terminal according to claim 2, wherein the search unit does not search for the specific cell stored in the storage unit when the element included in the notification is not included in the neighboring cell element.

4. The mobile communication terminal according to claim 2, wherein the search unit searches for the specific cell stored in the storage unit at first intervals when the element included in the notification is included in the neighboring cell element, and searches for the specific cell stored in the storage unit at second intervals longer than the first intervals when the element included in the notification is not included in the neighboring cell element.

5. A mobile communication system including a mobile communication terminal configured to communicate with a macrocell and a specific cell configured to be configurable with an access type, comprising:
   a reception unit configured to receive, from a cell that is anyone of the specific cell and the macrocell, notification including an element for identifying the cell;
   a storage unit configured to store a specific cell accessible by the mobile communication unit and a neighboring cell element for identifying a neighboring cell provided around the specific cell, while associating the specific cell and the neighboring cell element with each other;
   a search unit configured to search for the specific cell stored in the storage unit; and
   a registration unit configured to register a element for identifying a transition source cell as the neighboring cell element in the storage unit, when the mobile communication terminal is transitioned from the transition source cell to the specific cell accessible by the mobile communication unit.

6. A mobile communication method used in a mobile communication terminal configured to communicate with a macrocell and a specific cell configured to be configurable with an access type, wherein
the mobile communication terminal includes a storage unit configured to store a specific cell accessible by the mobile communication unit and a neighboring cell element for identifying a neighboring cell provided around the specific cell, while associating the specific cell and the neighboring cell element with each other, and
the method comprises:
   a step A of receiving, from a cell that is any one of the specific cell and the macrocell, notification including an element for identifying the cell;
   a step B of searching for the specific cell stored in the storage unit; and
   a step C of registering a element for identifying a transition source cell as the neighboring cell element in the storage unit, when the mobile communication terminal is transitioned from the transition source cell to the specific cell accessible by the mobile communication unit.

* * * * *